United States Patent
Dehu et al.

(10) Patent No.: US 7,562,520 B2
(45) Date of Patent: Jul. 21, 2009

(54) METHOD FOR OPENING A MOBILE COWL EQUIPPING A THRUST REVERSER

(75) Inventors: Michel Philippe Dehu, Tournefeuille (FR); Fabrice Henri Emile Metezeau, Montivilliers (FR)

(73) Assignee: Aircelle, Gonfreville l'Orcher (FR)

( * ) Notice: Subject to any disclaimer, the term of this patent is extended or adjusted under 35 U.S.C. 154(b) by 289 days.

(21) Appl. No.: 11/579,259

(22) PCT Filed: Jun. 9, 2005

(86) PCT No.: PCT/FR2005/001422

§ 371 (c)(1), (2), (4) Date: Nov. 1, 2006

(87) PCT Pub. No.: WO2006/010803

PCT Pub. Date: Feb. 2, 2006

(65) Prior Publication Data

US 2007/0220861 A1 Sep. 27, 2007

(30) Foreign Application Priority Data

Jun. 29, 2004 (FR) .................................. 04 07096

(51) Int. Cl.
*B63H 11/00* (2006.01)

(52) U.S. Cl. ................ 60/204; 60/226.2; 60/230
(58) Field of Classification Search ............... 60/204, 60/226.2, 230
See application file for complete search history.

(56) References Cited

U.S. PATENT DOCUMENTS

| 5,960,626 | A | 10/1999 | Baudu et al. |
| 2002/0157376 | A1 | 10/2002 | Ahrendt |
| 2002/0157377 | A1* | 10/2002 | Ahrendt ........................ 60/204 |
| 2003/0066283 | A1 | 4/2003 | Ahrendt |

FOREIGN PATENT DOCUMENTS

| EP | 0 843 089 A1 | 5/1998 |
| WO | WO 02/088540 A1 | 11/2002 |

* cited by examiner

*Primary Examiner*—Michael Cuff
*Assistant Examiner*—Vikansha S Dwivedi
(74) *Attorney, Agent, or Firm*—Oliff & Berridge, PLC

(57) ABSTRACT

The invention concerns a method for opening a mobile cowl (2) actuated by a motor (7) and equipping a turbojet thrust reverser, characterized in that it comprises, at the start of the opening phase, a bridling step (103) whereby the speed of the mobile cowl is maintained lower or equal to a predetermined threshold speed.

7 Claims, 2 Drawing Sheets

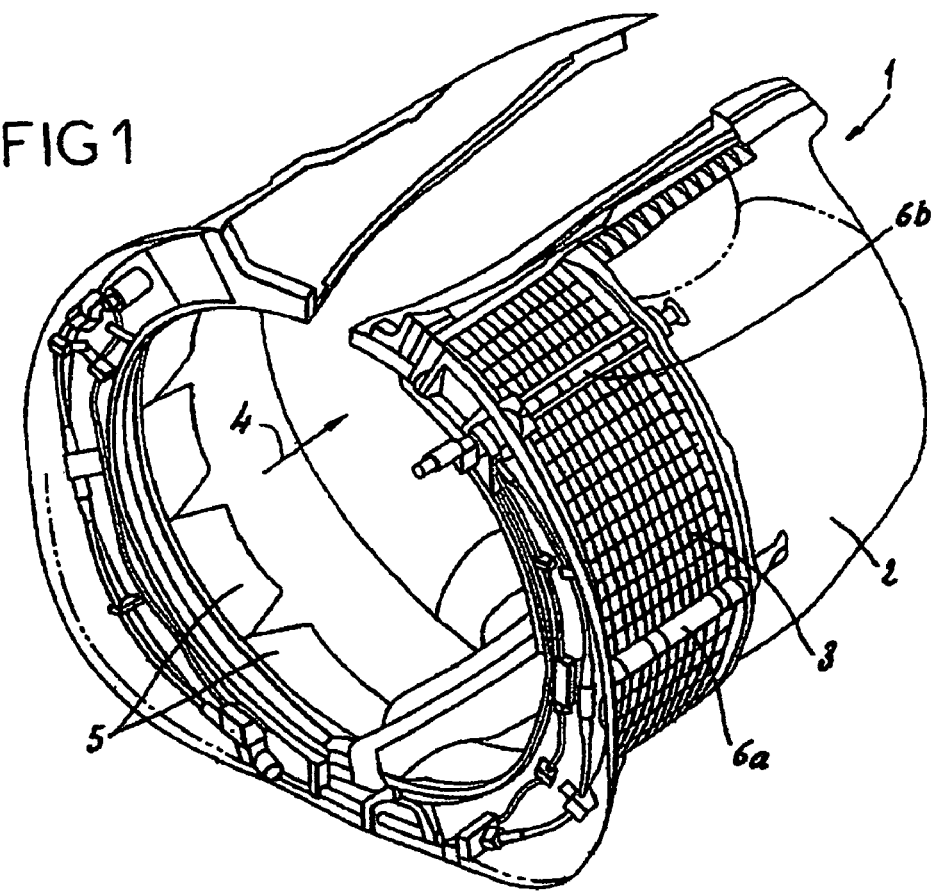
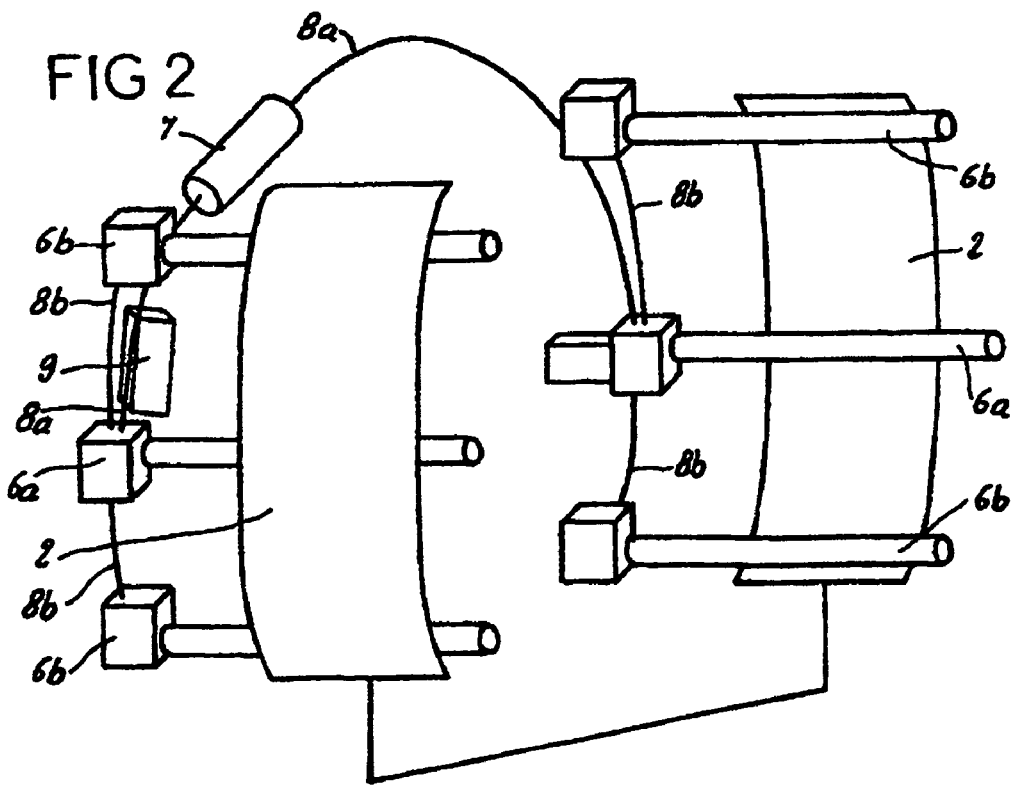

METHOD FOR OPENING A MOBILE COWL EQUIPPING A THRUST REVERSER

BACKGROUND

The present invention relates to a method for opening a movable cowl actuated by an electric motor and fitted to a thrust reverser for a turbojet.

The role of a thrust inverter for the landing of an aircraft is to improve the braking capacity of an aircraft by redirecting at least a portion of the thrust generated by the turbojet toward the front. In this phase, the inverter obstructs the gas exhaust duct and directs the exhaust stream from the engine toward the front of the pod, thereby generating a counter-thrust which is added to the braking of the aircraft wheels.

The implementation means for achieving this reorientation of the stream vary depending on the type of reverser. However, in all cases, the structure of a reverser comprises movable cowls that can be moved between, on the one hand, a deployed position in which they open in the pod a passageway designed for the diverted stream, and, on the other hand, a retracted position in which they close this passageway. These movable cowls may also fulfill the function of diversion or simply activation of other diversion means.

In reversers with grilles, for example, the movable cowls slide along rails so that, by moving backwards during the opening phase, they reveal diversion blade grilles placed in the thickness of the pod. A system of link rods connects this movable cowl to blocking doors which deploy inside the exhaust channel and block the direct stream outlet. In reversers with doors, on the other hand, each movable cowl pivots in order to come and block the stream and divert it and is therefore active in this reorientation.

In a general manner, these movable cowls are actuated by hydraulic or pneumatic cylinders which require a network for the conveyance of a pressurized fluid. This pressurized fluid is conventionally obtained by tapping air from the turbojet in the case of a pneumatic system or by offtaking from the hydraulic circuit of the aircraft. However, such systems require considerable maintenance because the slightest leak in the hydraulic or pneumatic network may have damaging consequences both for the reverser and for the other parts of the pod. Furthermore, because of the reduced space available in the front frame of the reverser, the installation and protection of such a circuit are particularly awkward and bulky.

To alleviate the various disadvantages associated with pneumatic and hydraulic systems, thrust reverser manufacturers have sought to replace them and as much as possible fit their reversers with electromechanical actuators that are lighter and more reliable. Such a reverser is described in document EP 0 843 089.

It should be noted that, to close the reverser, the movable cowl is immobilized by locks. These locks are important components for in-flight safety and are part of the most sensitive components of the thrust reverser. The latter are therefore particularly susceptible to being damaged, or even broken, in the event of too great an impact of the movable cowl. Specifically, if, during the maneuver, the locks could not open, due to a blockage, the movable cowl in motion would come to collide with them with full force.

In order to prevent such an accident, the locks are dimensioned to be able to withstand the probable impacts, thereby increasing their weight, which is not desirable in aviation.

SUMMARY

The object of the present invention is to remedy this aforementioned disadvantage and consists therefore in a method of opening a movable cowl actuated by a motor and fitted to a thrust reverser for a turbojet, characterized in that it comprises, at the beginning of the opening phase, a governing step during which the speed of the movable cowl is kept lower than or equal to a predetermined limit speed.

Thus, by limiting the speed of opening of the movable cowl at the beginning of travel, and more precisely until it has gone past the sensitive components, the power of an impact will be limited to that which these sensitive components can sustain without it being necessary to oversize them so that they can withstand an impact occurring at high speed and high power.

Advantageously, the motor actuating the movable cowl is an electric motor.

According to a variant embodiment of the invention, the speed of opening during the governing step is kept substantially equal to the predetermined limit speed.

According to a first embodiment of the method that is the object of the invention, the time during which the governing step is applied is predetermined.

According to a second embodiment of the method of the invention, the time during which the governing step is applied corresponds to the time that the movable cowl takes to reach a predetermined position. This position is defined so as to correspond to the passing of movable cowls beyond the sensitive components such as the locks.

Advantageously, the method according to the invention comprises a step of analyzing the turbojet operating speed upon which the application of the governing step is conditional. Thus, it is possible not to apply the governing sequence, which requires more time, in an emergency situation demanding a more rapid opening or a greater motor power.

Again advantageously, the method according to the invention comprises a control loop of the operating state of the electric motor capable of instructing the latter to stop in the event of blockage.

Preferably, the electric motor is controlled by a torque set point.

DETAILED DESCRIPTION OF DRAWINGS

The implementation of the invention will be better understood with the aid of the detailed description that is set out below with reference to the appended drawing in which:

FIG. 1 is a partial schematic view in perspective of a pod incorporating a thrust reverser with grille.

FIG. 2 is a schematic representation of the movable cowls and of their actuation system.

EMBODIMENTS

Figure 3:
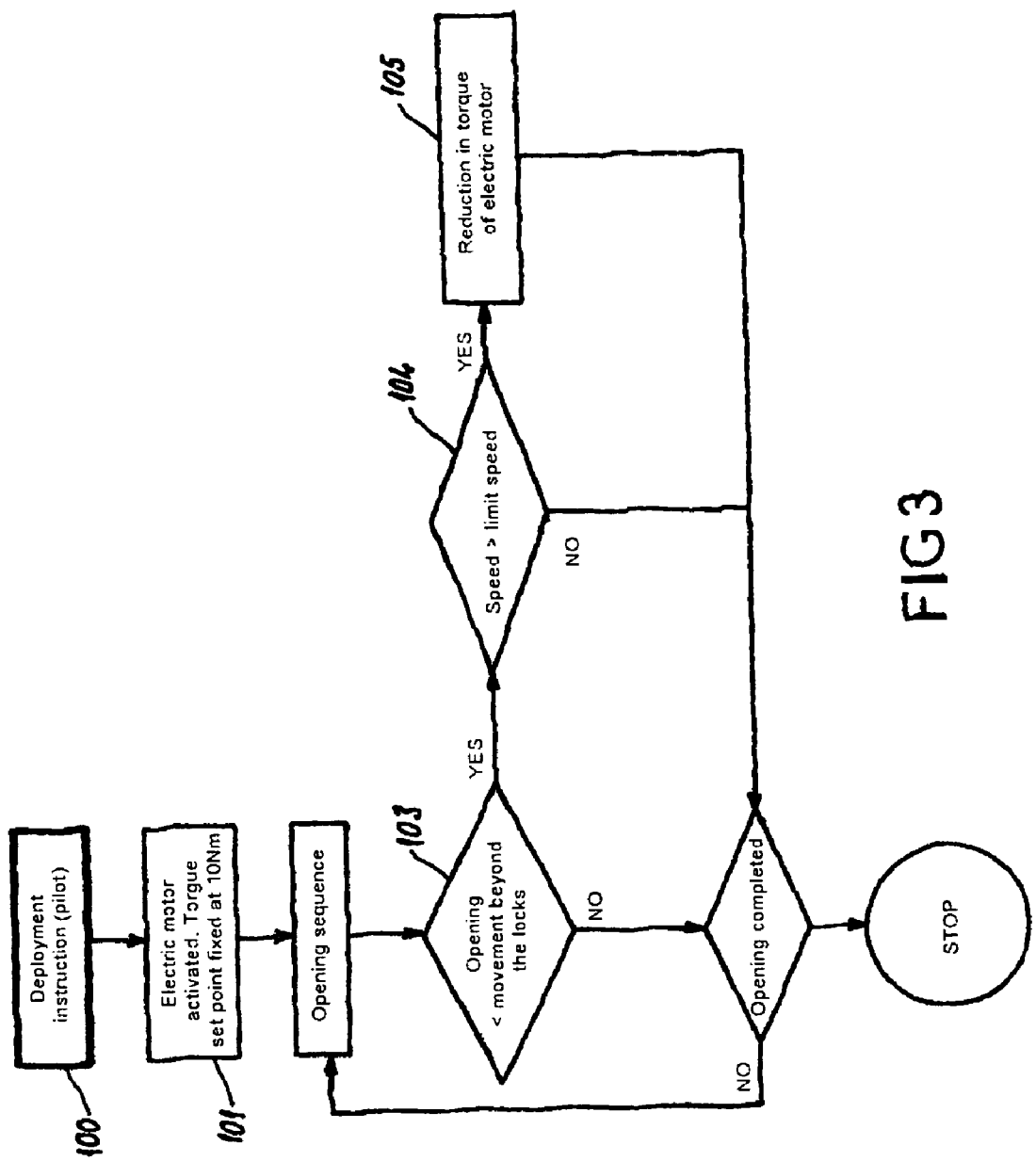
FIG. 3 is a diagram representing the operating steps of a method according to the invention.

Before describing in detail an embodiment of the invention, it is important to specify that the method described is not limited to one particular type of reverser. Although illustrated by a reverser with grilles comprising movable cowls sliding along rails, it could be applied to reversers of different design, particularly with doors. Furthermore, the principle of speed limitation at the beginning of the opening of the movable cowls may be applied to any type of motor actuating movable cowls, an electric motor only being easier to control.

FIG. 1 presents a partial schematic view of a pod incorporating a thrust reverser 1. The turbojet is not shown. This thrust reverser 1 has a structure comprising two semicircular movable cowls 2 capable of sliding along rails (not visible) to reveal diversion blade grilles 3 placed between the movable cowls 2 and a section of passageway of the air stream 4 to be diverted. Blocking doors 5 are placed inside the structure so as to be able to pivot and move from a position in which they do not hamper the passage of the air stream 4 to a position in which they block this passage. In order to coordinate the opening of the movable cowls 2 with a blocking position of the blocking doors 5, the latter are mechanically connected to the movable cowl 2 by hinges and to the fixed structure by a system of link rods (not shown).

The movable cowls 2 are moved on the rails along the outside of the structure by a set of cylinders 6a, 6b mounted on a front frame inside which are housed an electric motor 7 and flexible transmission shafts 8a, 8b respectively connected to the cylinders 6a, 6b in order to actuate them.

The system for actuating the movable cowls 2 is represented only in FIG. 2. Each movable cowl 2 may be translated along its rails under the action of three cylinders 6a, 6b, comprising a central cylinder 6a and two additional cylinders 6b, actuated by a single electric motor 7 connected to a control interface 9. The power delivered by the electric motor 7 is first of all delivered to the central cylinders 6a by means of two flexible transmission shafts 8a, then to the additional cylinders 6b via flexible transmission shafts 8b.

An automatically controlled synchronous motor is an electric motor 7 particularly well suited to a method according to the invention because it is capable of receiving a torque or speed instruction. Its operation is based on the interaction between a rotor-related magnetic field and a rotating stator-related magnetic field. In such an electric motor 7, a sensor detects the exact position of the rotor and allows a frequency converter to maintain a 90° angle between the rotor and the stator-related rotating field so that the motor torque is always maximal. A modulation of the amplitude of the stator-related rotating field fixes the value of the motor torque. The sensor also gives information on the speed of rotation of the electric motor 7.

Controlling the delivered torque and the speed of rotation of such an electric motor 7 is simple. In order for the speed to remain constant in the case of the decrease or increase of load, the motor torque must be decreased or increased. The amplitude of the stator-related rotating field will therefore be reduced or increased but the frequency of the field will not be modified. For the torque to remain constant, the speed must be reduced while maintaining the amplitude of the stator-related field. A variator reduces the frequency of the stator-related field while retaining its amplitude.

A diagram showing the steps of a method according to the invention for the opening in normal conditions of the thrust reverser 1 is shown in FIG. 3.

Initially, the instruction 100 to deploy the reverser is given by the pilot. The electric motor 7 is activated during a step 101 which fixes therefor a torque set point equal to 10 Nm for example. Then follows a determined opening sequence causing the movable cowls 2 to open.

The sequence also comprises two test sub-steps 103, 104, forming a step for governing the electric motor 7, consisting in regularly analyzing respectively the movement of the movable cowl 2 then the speed of rotation of the electric motor 7.

If, during the test step 103, it appears that the movable cowl has not moved past the position of the locks, then the test step 104 is applied, otherwise the opening sequence continues normally until its end, when the movable cowl is fully open. Analyzing the movement of the movable cowls 2 therefore makes it possible to apply the speed limitation at the beginning of opening only. In practice, the movement of the movable cowls 2 is obtained by means of a resolver terminating the flexible transmission shaft 8a and making it possible to count the number of revolutions made by the latter. However, other means are totally envisageable.

Following the test step 103, the test step 104 therefore analyzes the speed of rotation of the electric motor 7, representative of the speed of opening of the movable cowl 2. If the speed of rotation of the electric motor 7 is greater than the predetermined limit speed, then an instruction 105 fixes a lower torque set point for the electric motor 7. By reducing the torque delivered by the electric motor 7 while the loads to be overcome remain constant, the speed also reduces.

It is also possible to provide a sub-step consisting in testing whether the speed of rotation is lower than the predetermined limit speed so as to obtain a regulation of the speed keeping the latter as close as possible to the limit value, thereby preventing too great a limitation of the speed causing an unnecessary waste of time.

Once this test step 104 is completed and where necessary a new torque set point has been fixed, the method resumes the opening sequence until its end.

Although the invention has been described in connection with particular exemplary embodiments, it is clearly evident that it is in no way limited and that it includes all the technical equivalents of the means described and their combinations if the latter enter into the context of the invention.

The invention claimed is:

1. A method for opening a movable cowl actuated by a motor and fitted to a thrust reverser for a turbojet, wherein the method comprises governing a speed of the moveable cowl such that the speed is kept lower than or equal to a predetermined limit speed during an opening of the moveable cowl for a time that the moveable cowl takes to reach a predetermined position, and wherein the speed is not kept lower than or equal to the predetermined limit speed after the time that the moveable cowl takes to reach the predetermined position.

2. The opening method as claimed in claim 1, wherein the motor actuating the movable cowl is an electric motor.

3. The opening method as claimed in claim 1, wherein the speed of opening of the cowl during the governing step is kept substantially equal to the predetermined limit speed.

4. The opening method as claimed in claim 1, wherein a time during which the governing step is applied is predetermined.

5. The opening method as claimed in claim 1, wherein the method further comprises a step of analyzing an operating speed of the turbojet upon which the application of the governing step is conditional.

6. The opening method as claimed in claim 1, wherein the method further comprises a control loop for an operating state of the motor capable of instructing the motor to stop in the event of blockage.

7. The opening method as claimed in claim 1, wherein the motor is controlled by a torque set point.

* * * * *